(12) United States Patent
Petzold et al.

(10) Patent No.: US 7,530,262 B2
(45) Date of Patent: May 12, 2009

(54) METHOD FOR DETERMINING AN ACTUATING PRESSURE IN AN ACTUATING CYLINDER

(75) Inventors: Rainer Petzold, Friedrichshafen (DE); Robert Ingenbleek, Kressbronn (DE); Mario Steinborn, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 126 days.

(21) Appl. No.: 11/788,484

(22) Filed: Apr. 20, 2007

(65) Prior Publication Data

US 2007/0256483 A1 Nov. 8, 2007

(30) Foreign Application Priority Data

Apr. 20, 2006 (DE) .................. 10 2006 018 314

(51) Int. Cl.
*G01M 13/02* (2006.01)
(52) U.S. Cl. .................................. 73/115.03
(58) Field of Classification Search .............. 73/1.79, 73/115.01, 115.02, 115.03, 115.04
See application file for complete search history.

(56) References Cited

U.S. PATENT DOCUMENTS

| 4,646,556 | A | 3/1987 | Courcoux et al. |
| 5,829,335 | A | 11/1998 | Ewald et al. |
| 5,832,777 | A | 11/1998 | Weilant |
| 6,532,980 | B1 | 3/2003 | Langeveld |
| 6,694,803 | B2 | 2/2004 | Klik et al. |
| 6,705,175 | B1 | 3/2004 | Klatt |
| 2007/0245842 | A1* | 10/2007 | Petzold et al. ............. 74/335 |

FOREIGN PATENT DOCUMENTS

| DE | 195 13 032 C1 | 8/1996 |
| DE | 19731842 A1 | 1/1998 |
| DE | 199 18 164 A1 | 10/2000 |
| DE | 199 31 973 A1 | 1/2001 |
| DE | 101 31 853 A1 | 1/2003 |
| EP | 0723097 A2 | 7/1996 |
| EP | 1 067 319 A2 | 1/2001 |
| GB | 2315526 A | 2/1998 |

* cited by examiner

*Primary Examiner*—Eric S McCall
(74) *Attorney, Agent, or Firm*—Davis & Bujold, P.L.L.C.

(57) ABSTRACT

A method for determining an actuating pressure of an operating element (1), for example in a motor vehicle, where the element is displaced as a result of the application of the actuating pressure. The actuating pressure of the operating element is determined without the use of a pressure sensor by way of deformation measurement.

19 Claims, 1 Drawing Sheet

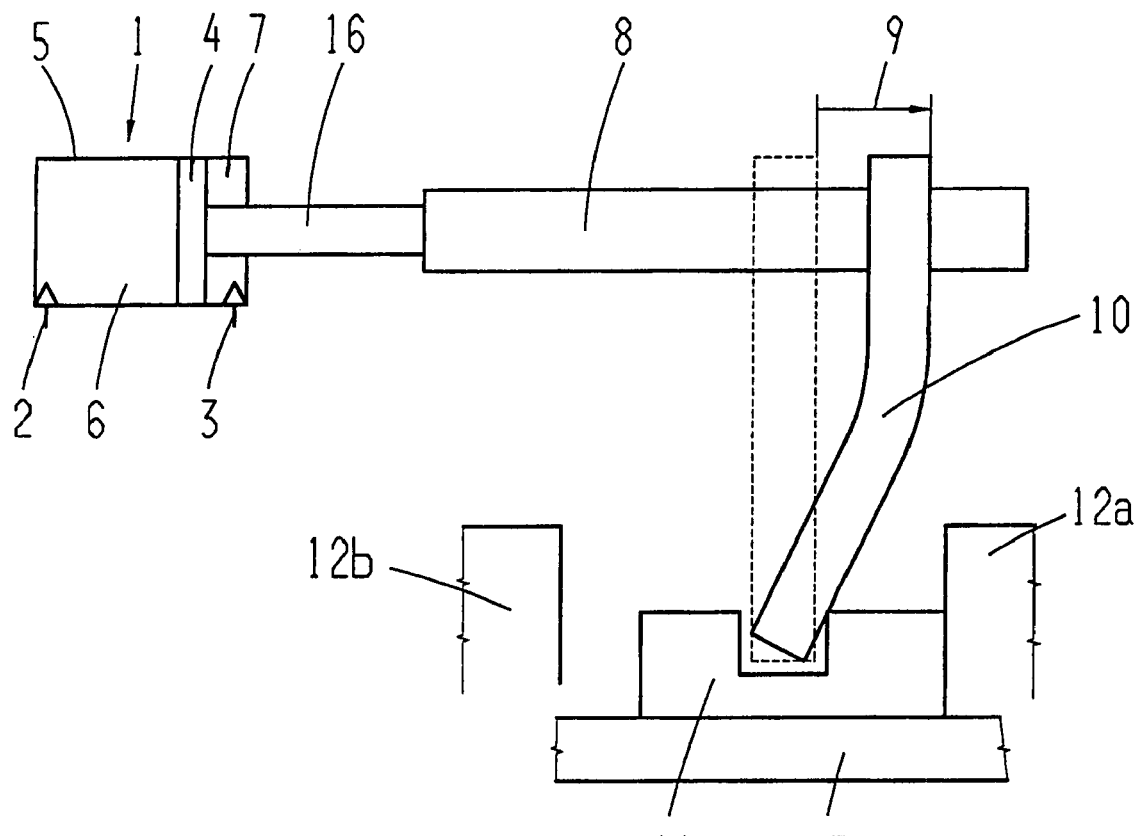
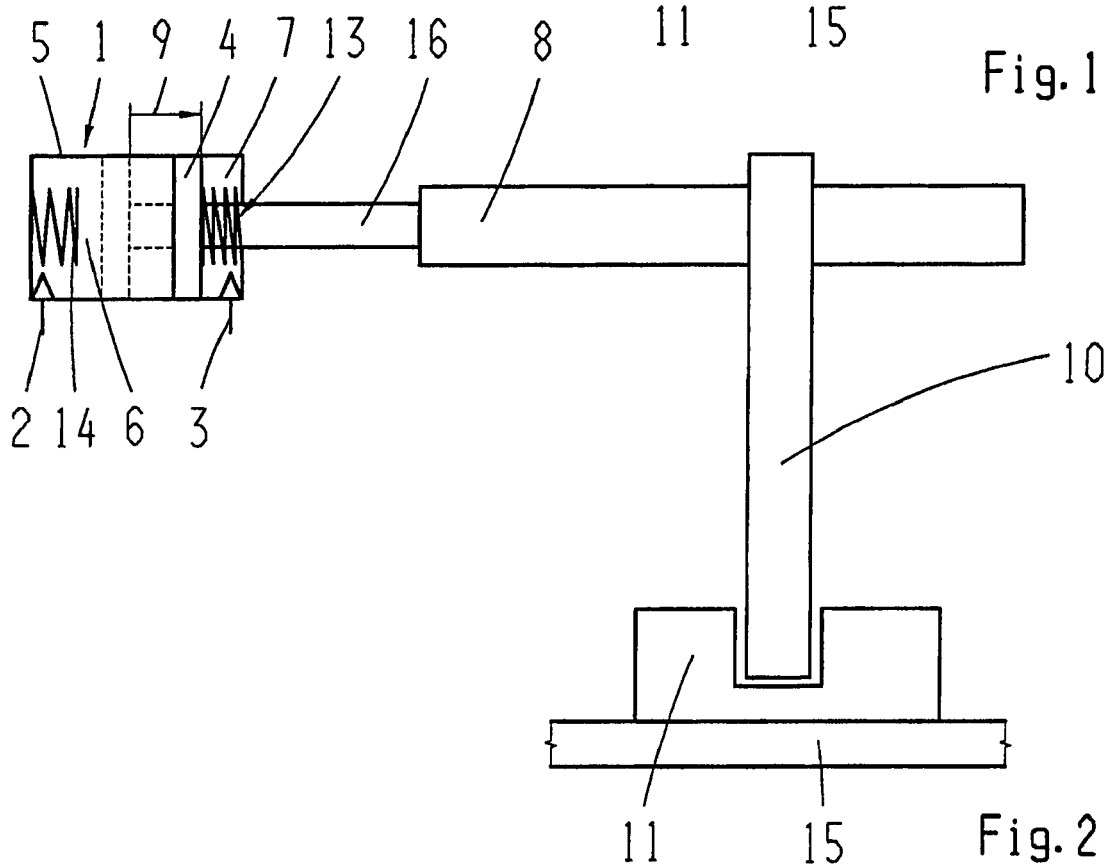

METHOD FOR DETERMINING AN ACTUATING PRESSURE IN AN ACTUATING CYLINDER

This application claims priority from German Application Serial No. 10 2006 018 314.2 filed Apr. 20, 2006.

FIELD OF THE INVENTION

The invention relates to a method for determining an actuating pressure of an operating element, for example in a motor vehicle.

BACKGROUND OF THE INVENTION

The main components of automatic transmissions are conventional, as are manually operated gear mechanisms, wherein the shifting and/or starting clutch between the driving motor and transmission, as well as the selection and shifting of gears, are actuated automatically using corresponding operating elements. These operating elements are typically configured as hydraulic or pneumatic actuating cylinders or as electric actuators, which act upon actuating devices for the above gear functions. The actuating devices can be provided on or in the transmission.

For the actuation of hydraulic or pneumatic operating elements, pressure-generating and control devices are required which, according to the state of the art, comprise a hydraulic or pneumatic pump as the pressure-generating device, a pressure accumulator, a hydraulic or pneumatic control unit with control valves and sensors, which are connected to a central control and regulating device, and can be actuated by the same, based on control and regulating functions stored there.

For cost reasons and to minimize the complexity of an actuating element, it is frequently undesirable to provide a separate pressure sensor for determining the actuating pressure of an actuating cylinder.

DE 101 31 853 A1 describes a method for determining the actuation pressure of a positioning cylinder operated by fluid pressure. This method uses only one pressure sensor for determining the actuation pressure. This pressure sensor is located between a main shut-off valve and control valves for actuating the actuating cylinder and, depending on the positions of the valves of the actuating element, can sense different pressures, for example the inflow pressure from the pressure supply system or a pressure comparable to the actuating pressure of the actuating cylinder. By applying an actuating pressure on the actuating cylinder, the cylinder is displaced. The displacement can be obtained from an existing signal, for example the signal of a displacement sensor integrated in the actuating cylinder or attached externally. The actuating pressure of the actuating cylinder is determined by computation from the inflow pressure detected by the pressure sensor, using the change in travel effected by the actuating pressure. Compared to other known methods also using only one pressure sensor, this method achieves greater accuracy for determining the actuating pressure and hence the actuating force of an actuating cylinder operated by pressurized medium.

It is the object of the invention to provide a method for determining an actuating pressure of an operating element, according to which the actuating pressure is determined without the use of a pressure sensor.

SUMMARY OF THE INVENTION

In motor vehicles, the selection and shifting of gears as well as the actuation of the shifting clutch and/or starting clutch between the driving motor and the transmission are accomplished with operating elements. These operating elements can be configured, for example, as actuating cylinders actuated by means of a pressurized agent. When a pressurized agent is applied to the pressure chambers of such actuating cylinders, corresponding shifting forces develop in these pressure chambers. These shifting forces, in turn, displace a piston of the actuating cylinder in an appropriate direction. As a result of piston displacement, a force can be applied on an actuating element, which is connected to the actuating cylinder. These actuating devices can be configured, for example, as shifting rods, which are connected to sliding sleeves via shifting forks. Through the axial displacement of the shifting rods, and thus of the sliding sleeves, by the actuating cylinder, a shift of a gear ratio in a transmission is achieved. For example, a spur gear is connected non-rotatably with a gear shaft by the sliding sleeve, via claw-like involute splines, which are provided on the side of the spur gear.

According to the method specified in the invention, the actuating pressure of an actuating cylinder is determined by way of a deformation measurement. Once the effects of the shifting force of the actuating cylinder on other elements is known, for example deflection and/or deformation of actuating devices, spring elements or stops, the pressure in the cylinder chamber can be derived from the behavior or these elements by measuring this behavior. For this purpose, the travel of the actuating cylinder as a result of the actuating pressure of the actuating cylinder is detected. The travel can be obtained from an existing signal, for example the signal of a displacement sensor integrated in the actuating cylinder or attached externally.

During a shifting process in a transmission, the actuating elements positioned on the actuating cylinder, such as the shifting rods or shifting forks, are deformed as a result of the shifting force of the actuating cylinder. Since a change in the displacement of an actuating cylinder can be sensed with great precision, the deformation of the actuating elements can also be precisely determined. Displacement of the actual cylinder during a shifting process consists of the nominal cylinder displacement and the displacement of the deflection of the actuating elements. The nominal cylinder displacement is the distance that the actuating cylinder travels to reliably guarantee shifting of a gear, such that the actuating elements are not deformed. The nominal cylinder displacement for shifting a gear is a known value, which is stored in a device such as a control and regulating unit. The deflection increases with the shifting force of the actuating cylinder. By determining the difference between the nominal travel and the travel produced by the control pressure (deformation measurement), the shifting force in the pressure chambers of the actuating cylinder and hence of the actuating pressure in the pressurant lines can be determined. The displacement of the deflection is obtained from the total cylinder displacement minus the nominal cylinder displacement. The known nominal cylinder displacement is used by the control and regulating unit together with the actual cylinder displacement for computation purposes. If no difference exists between the nominal travel and the actual travel of the operating element, this corresponds to a defined pressure value or a corresponding shifting force of the operating element, whereby the value is stored in a device such as a control and regulating unit. When the actual cylinder displacement is greater than the nominal cylinder displacement, this difference can be used to determine the deformation of the actuating device. This displacement difference is then used to determine the actuating pressure and hence the shifting force of the actuating cylinder. When the actual cylinder displacement is less than the nominal cylinder displacement, the pressure in the pressure chamber of the cylinder is increased by the appropriate selection of a pressure control device, to reliably guarantee the shifting of a gear.

Furthermore, it is conceivable that the deformation of the actuating element can be detected by way of a strain gauge. When a strain gauge is deformed as a result of a deformation of an actuating element, the electric resistance of the same changes. The actuating pressure of the actuating cylinder can be determined from the signal of the change in resistance.

Furthermore, it is possible to provide elastic stops in the actuating cylinder. These stops should be configured such that they undergo varying degrees of deformation as a function of the piston force. By measuring the cylinder displacement, the deformation of such stops can be sensed, allowing the internal cylinder pressure to be determined. To do so, the rigidity of the stops must be known. For this purpose, the nominal displacement of the actuating cylinder is subtracted from the measured cylinder displacement. The resulting difference allows the deformation of the stops and of the internal cylinder pressure to be determined.

In another configuration, spring elements may be provided between the cylinder piston and the limit stops of the actuating cylinder. It is also conceivable that the spring elements may be provided between the piston rod of the cylinder and stops provided outside of the cylinder. By measuring the deflection of these spring elements, the internal cylinder pressure can also be determined. Here, the spring travel is proportional to the pressure or force acting on the cylinder piston. In order to determine the pressure in the actuating cylinder via spring elements, the rigidity of the spring elements must be known. The greater the rigidity of the spring element, the smaller the deflection. In this context, the nominal travel is the distance traveled by the cylinder piston before the spring element is deformed. If the actuating pressure is larger, the cylinder piston presses the spring element together. This deformation of the spring element is then used to determine the actuating pressure of the actuating cylinder.

When the actuating pressure of the actuating cylinder is determined from the deformation, for example of stops or spring elements, the actual cylinder displacement consists of the nominal cylinder displacement, the displacement as a result of the deformation of a stop or spring element and optionally consists of the deformation of an actuating element, such as a shifting rod and/or a shifting fork.

When moving elements hit stops or synchronization devices, for example, overshooting may occur due to dynamic forces. By measuring the overshooting and comparing it with the static deformation, the dynamic force and hence the actuating pressure of the actuating cylinder can be determined. The degree of the overshooting can also be determined by way of a displacement measurement.

When the actuating pressure of the actuating cylinder exceeds a maximum value or drops below a minimum value, the selection or control of the actuating cylinder can be modified accordingly by a device, such as a regulating and control unit. For example, if the nominal displacement of the actuating cylinder has not been reached, the pressure in the corresponding pressure chamber of the actuating cylinder is increased accordingly, for example by way of a pressure control device, to reliably guarantee a shifting process.

When the actuating pressure is determined on more than one actuating cylinder in the same pressure range, the actuating cylinders can be used for conducting plausibility, diagnostics and/or calibration steps in relation to each other. When the actuating pressure is determined in at least one actuating cylinder of an operating unit having more than one actuating cylinder, the signal can be used to control the pressure of the operating unit, for example by way of at least one main shut-off valve.

When the deformation is measured on more than one actuating cylinder, which are connected to each other and among which the pressure is about the same, and when the deformation measurements produce different values, the conclusion can be drawn that exterior forces are acting upon the cylinders. If it is known on which cylinders exterior forces act, the forces can be determined by way of comparison.

By opening all required valves of an operating unit, from the actuating cylinder to a pressurant supply system, the pressure of the pressurant supply can be determined. When the pressure drops below a minimum value or exceeds a maximum value, warnings may be issued and/or shifting may be prevented. Furthermore, the actuation of the actuating cylinders, with respect to their selection and control behavior, can be changed as a function of the shifting pressure by way of a device such as a control and regulating unit.

If deformation of an actuating element, a stop or a spring element is measured for an actuating cylinder despite it not being selected, undesirable filling of the actuating cylinder must have occurred or an external force must be acting upon the actuating element. This deformation can be recorded for diagnostic purposes, for example, valve diagnosis. As a result, for example, a leak of a control valve may be detected.

With the method according to the invention, the presence of a deformation of an element, for example of a shifting rod, a shifting fork, a stop and/or a spring element, resulting from a shifting force of an operating element can be used to determine the actuating pressure of the operating element, by measuring the deformation of the element. The displacement signal of the operating element, for example of an actuating cylinder, is used to determine deformation of the element with the deformation used for pressure regulation, for force regulation or for measuring the supply pressure. Consequently, a pressure sensor can be foregone on the pressure control device. This way, component costs can be saved, and the space required for the installation of the pressure control device can be reduced.

BRIEF DESCRIPTION OF THE DRAWINGS

The invention will now be described, by way of example, with reference to the accompanying drawings in which:

FIG. 1 is an example of a design for determining an actuating pressure of an operating element from the deformation of a shifting fork;

FIG. 2 is an example of a design for determining an actuating pressure of an operating element from the deformation of spring elements in the operating element.

DETAILED DESCRIPTION OF THE INVENTION

FIG. 1 shows one example of a design for determining a shifting pressure in an operating element 1, for example in an actuating cylinder. Pressurant lines 2, 3 are connected to pressure chambers 6, 7 of the actuating cylinder 1. The actuating cylinder 1 comprises a cylinder 5, a piston 4 and a piston rod 16. The piston rod 16 is connected to a shifting rod 8 on which a shifting fork 10 is located. The shifting fork 10 engages a sliding sleeve 11, which can move axially on a shaft 15, for example a gear shaft. By appropriately activating a pressure regulating device (not shown here), an appropriate control pressure is applied on the pressurant line 2, thus creating the appropriate shifting force in the pressure chamber 6 of the actuating cylinder 1. As a result of this control pressure and/or the shifting force in the pressure chamber 6 of the actuating cylinder 1, the piston 4 in the cylinder 5 and the piston rod 16 attached to the piston 4 are moved, to the right in the plane of FIG. 1. The piston 4 and the piston rod 16 can also be produced from one piece. As a result of the displacement of the piston 4 and thus of the piston rod 16, to the right in the plane of FIG. 1, the shifting rod 8, the shifting fork 10 and the sliding sleeve 11 are also displaced to the right. The piston 4 is thus displaced until the sliding sleeve 11 hits against a stop 12a, for example the teeth on a shifting gear. This displacement corresponds to the nominal displacement of the actuating cylinder 1. When the actuating pressure in the pressure chamber 6 of the actuating cylinder 1 is greater than is required for the nominal displacement, the shifting rod 8 is displaced further to the right, resulting in a deformation of the shifting fork 10. By subtracting the nominal displacement from the total displacement of the piston 4, a difference in displacement 9 is obtained, which results from the deformation of the shifting fork 10. This difference 9 can be used in a device, such as a regulating and control unit, to compute the actuating pressure in the pressure chamber 6 of the actuating cylinder 1 with the pressure influenced by corresponding control and regulating functions.

The sliding sleeve 11 is actuated toward the left in the plane of FIG. 1 in a mirror process. The pressure chamber 7 in this case is supplied with an actuating pressure, via the pressurant line 3, to displace the piston 4 in the cylinder 5 to the left. The piston 4 is displaced until the sliding sleeve 11 hits against a stop 12b, for example, the teeth of a shifting gear.

FIG. 2 shows another example of a design for determining a shifting pressure in the operating element 1, for example in an actuating cylinder. Unlike in FIG. 1, the actuating pressure of the actuating cylinder 1 is not determined from a deformation of the shifting fork 10, but rather from a deformation of a spring element 13, 14. For this purpose, spring elements 13, 14 are positioned between the piston 4 and the limit stops of the actuating cylinder 1. By appropriately activating a pressure regulating device (not shown here), an appropriate control pressure is applied on the pressurant line 2 and thus in the pressure chamber 6 of the actuating cylinder 1. As a result of this control pressure and/or the shifting force in the pressure chamber 6 of the actuating cylinder 1, a piston 4 in the cylinder 5 and a piston rod 16 on the piston 4 are displaced to the right in the plane of FIG. 2. The piston rod 16 is connected to the shifting rod 8. As a result of the displacement of the piston 4 and thus of the piston rod 16 to the right in the plane of FIG. 2, the shifting rod 8, the shifting fork 10 and the sliding sleeve 11, which can move axially on the shaft 15, are likewise displaced to the right. The piston 4 is displaced until it hits the spring element 13. This displacement corresponds to the nominal displacement of the actuating cylinder 1. When the actuating pressure in the pressure chamber 6 of the actuating cylinder 1 is greater than is required for the nominal displacement, the shifting rod 8 is displaced further to the right, resulting in a deformation of the spring element 13. By subtracting the nominal displacement from the total displacement of the piston 4, a difference in displacement 9 is obtained, which results from the deformation of the spring element 13. This difference 9 can be used in a device such as a regulating and control unit, to determine the actuating pressure in the pressure chamber 6 of the actuating cylinder 1 such that the pressure can be influenced by corresponding control and regulating functions.

The sliding sleeve 11 is actuated to the left in the plane of FIG. 2 in a mirror process. The pressure chamber 7 in this case is supplied with an actuating pressure, via the pressurant line 3, to displace the piston 4 in the cylinder 5 to the left. When the actuating pressure in the pressure chamber 7 of the actuating cylinder 1 is greater than required for the nominal displacement, the shifting rod 8 is displaced further to the left, resulting in a deformation of the spring element 14.

REFERENCE NUMERALS

1 operating element, actuating cylinder
2 pressurant line for the operating element
3 pressurant line for the operating element
4 piston
5 cylinder
6 pressure chamber
7 pressure chamber
8 shifting rod
9 difference in displacement due to deformation
10 shifting fork
11 sliding sleeve
12a stop
12b stop
13 spring element
14 spring element
15 shaft
16 piston rod

The invention claimed is:

1. A method for determining an actuating pressure of an actuating cylinder (1) in a motor vehicle, and a piston (4), accommodated within the actuating cylinder (1), being displaced upon application of the actuating pressure, the method comprising the steps of:
 displacing the piston (4), within the actuating cylinder (1), by actuating the piston (4) with the actuating pressure;
 obtaining a nominal displacement value of the piston (4);
 obtaining an actual displacement value of the piston (4); and
 calculating a difference in displacement (9) between the actual displacement value and the nominal displacement value to determine the actuating pressure of the piston (4).

2. The method according to claim 1, further comprising the step of producing the difference in displacement (9) by a deformation of at least one of a shifting rod (8) and a shifting fork (10), and the deformation of at least one of the shifting rod (8) and the shifting fork (10) being at least partially dependent on the actuating pressure of the piston (4).

3. The method according to claim 1, further comprising the step of producing the difference in displacement (9) by a deformation of at least one operating element stop, which deforms in varying degrees as a function of the actuating pressure of the piston (4).

4. The method according to claim 1, further comprising the step of producing the difference in displacement (9) by a deformation of at least one spring element (13, 14), which deforms in varying degrees as a function of the actuating pressure of the piston (4).

5. The method according to claim 1, further comprising the step of determining at least one of a dynamic force and the actuating pressure of the piston (4) which cause the piston (4) to impact one of a stop and a synchronization device which results in overshooting.

6. The method according to claim 1, further comprising the step of detecting a change in displacement of the piston (4) with a displacement sensor which is one of integral with the piston (4) and attached externally thereto.

7. The method according to claim 1, further comprising the steps of at least one of issuing a warning message and preventing shifting if the actuating pressure is one of greater than a maximum pressure and less than a minimum pressure.

8. The method according to claim 1, further comprising the step of utilizing the difference in displacement (9) obtained by deformation one of at least one of a stop element and a spring element for diagnostic purposes.

9. The method according to claim 1, further comprising the step of one of controlling and regulating a shifting force of the piston (4) by conducting the determined actuating pressure to a pressure chamber of the operating element (1).

10. The method according to claim 9, further comprising the step of increasing the determined actuating pressure conducted to the pressure chamber of the operating element (1) if the nominal displacement value of the piston (4) is not achieved.

11. A device for determining an actuating pressure of an operating element(1) device comprising:
- an actuating element coupled with the operating element (1);
- a control unit in communication with the actuating element, and the control unit displacing the actuating element by application of an actuating pressure;
- a device for detecting displacement of the actuating element from a nominal displacement value to an actual displacement value; and
- the actuating pressure in the operating element (1) is determined from a difference in displacement (9) between the nominal displacement value and the actual displacement value.

12. The device according to claim 11, wherein the operating element (1) is actuated by one of a pneumatically pressurized agent and a hydraulically pressurized agent.

13. The device according to claim 11, wherein the device for detecting the displacement of the actuating element is a displacement sensor which is one of integrated on the operating element (1) and provided externally.

14. The device according to claim 11, wherein stops are at least one of provided in the operating element (1) and outside of the operating element (1), and the stops deforming to varying degrees as a function of a shifting force of the actuating element.

15. The device according to claim 11, wherein spring elements (13, 14) are located between a piston (4) and limit stops of the operating element (1), and the spring elements (13, 14) deforming to varying degrees as a function of a shifting force of the actuating element.

16. The device according to claim 11, wherein spring elements (13, 14) are located between a piston rod (16) of the operating element (1) and stops located outside of the operating element (1), and the spring elements (13, 14) deforming to varying degrees as a function of a shifting force of the actuating element.

17. The device according to claim 11, wherein the operating element (1) comprises an actuating cylinder.

18. The device according to claim 17, wherein the operating element (1) comprises an actuator of a motor vehicle transmission.

19. The device according to claim 18, wherein the operating element (1) comprises one of a transmission brake, a gear shaft and at least one of a shifting clutch actuating element and a starting clutch actuating element, located between a driving motor and the transmission.

* * * * *